United States Patent Office 2,967,100
Patented Jan. 3, 1961

2,967,100

SOIL STERILIZATION BY USE OF BETA-PROPIOLACTONE

Charles R. Phillips, 608 N. Market St.; Louis P. Greenberg, 15 Frederick Ave.; and Robert K. Hoffman, 507 Culler Ave., all of Frederick, Md.

No Drawing. Filed Sept. 25, 1958, Ser. No. 763,421

3 Claims. (Cl. 71—2.5)

(Granted under Title 35, U.S. Code (1952), sec. 266)

The invention described herein may be manufactured and used by or for the Government of the United States of America for governmental purposes without the payment to us of any royalty thereon.

This invention relates to a method of disinfecting, disinfesting and deweeding soil by treating the soil with an aqueous solution of beta-propiolactone.

Soil sterilization and disinfecting is important in many areas of plant experimentation. Heretofore such sterilization has been generally accomplished by heat as well as various types of volatile disinfectants. All of these methods are slow and costly compared to the method of this invention. The application of heat requires a prolonged period of time to be effective and volatile disinfectants have to vaporize and be dissipated from the soil. All of them are expensive.

In contrast, the method of the present invention is effected by applying a one percent water solution of beta-propiolactone to the soil in an amount equivalent to approximately ⅛ inch of precipitation for every 1 inch depth of soil to be sterilized. It is advantageous, especially if the soil is indoors, to cover with a tarpaulin to prevent excessive volatilization and loss of the lactone. It was found that the application resulted in a complete kill of microorganisms in 2 to 3 hours. Nematodes in the soil were killed almost instantly and seeds present at time of treatment did not germinate, whereas seeds planted 48 hours later showed normal germination and growth. In view of this, the treated soil is left undisturbed for from 48 to 72 hours after which it is ready for use.

The advantage of this method is that weed seeds, insects, bacteria and fungi are all simultaneously destroyed by the treatment. The beta-propiolactone subsequently hydrolyzes to innocuous B-hydroxy propionic acid, the presence of which may result in slightly reduced pH of the soil which may be readjusted where rigid pH soil requirements are present.

Complete hydrolysis may be expected in 24 to 48 hours.

We claim:

1. A method of sterilizing soil which comprises applying to the soil beta-propiolactone in an amount sufficient to effect sterilization to the required depth.

2. A method of sterilizing soil which comprises applying to the soil an aqueous solution of beta-propiolactone in an amount sufficient to effect sterilization to the required depth.

3. A method of sterilizing soil which comprises applying to the soil a one percent aqueous solution of beta-propiolactone to the extent of about ⅛ inch of precipitation per inch of soil depth.

References Cited in the file of this patent

UNITED STATES PATENTS

| 2,591,589 | Mowry | Apr. 1, 1952 |

FOREIGN PATENTS

| 740,076 | Great Britain | Nov. 9, 1955 |
| 740,081 | Great Britain | Nov. 9, 1955 |

OTHER REFERENCES

Bernheim et al.: Prac. Soc. Expt. Biol. Med. 80, 162–4 (1952).